(12) United States Patent
Radosavljevic et al.

(10) Patent No.: US 7,638,169 B2
(45) Date of Patent: Dec. 29, 2009

(54) DIRECTING CARBON NANOTUBE GROWTH

(75) Inventors: Marko Radosavljevic, Portland, OR (US); Jack T. Kavalieros, Portland, OR (US); Amlan Majumdar, White Plains, NY (US); Suman Datta, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 651 days.

(21) Appl. No.: 11/391,920

(22) Filed: Mar. 28, 2006

(65) Prior Publication Data

US 2009/0283496 A1 Nov. 19, 2009

(51) Int. Cl.
C23C 16/00 (2006.01)
(52) U.S. Cl. .................................. 427/249.1
(58) Field of Classification Search ............... 427/249.1; 423/447.3
See application file for complete search history.

(56) References Cited

U.S. PATENT DOCUMENTS

| | | | | |
|---|---|---|---|---|
| 6,129,901 A * | 10/2000 | Moskovits et al. | ....... | 423/447.3 |
| 6,346,189 B1 * | 2/2002 | Dai et al. | ..................... | 205/766 |
| 6,833,558 B2 * | 12/2004 | Lee et al. | ....................... | 257/49 |
| 2001/0028872 A1 * | 10/2001 | Iwasaki et al. | ........... | 423/447.3 |
| 2003/0007924 A1 * | 1/2003 | Goto et al. | .................. | 423/461 |
| 2003/0185985 A1 * | 10/2003 | Bronikowski et al. | ....... | 427/258 |

OTHER PUBLICATIONS

Ural, et al: Electric-Field-Aligned Growth of Single-Walled Carbon Nanotubes on Surfaces; Applied Physics Letters, vol. 81, No. 18; Oct. 28, 2002, pp. 3464-3466.

U.S. Appl. No. 11/082,000, Title: Carbon Nanotubes with Controlled Diameter, Length, and Metallic Contacts, Inventor: Valery M. Dubin, filed Mar. 15, 2005.

* cited by examiner

*Primary Examiner*—Roberts Culbert (57) ABSTRACT

Embodiments of the invention include apparatuses and methods relating to directed carbon nanotube growth using a patterned layer. In some embodiments, the patterned layer includes an inhibitor material that directs the growth of carbon nanotubes.

13 Claims, 5 Drawing Sheets

FIG. 4C

DIRECTING CARBON NANOTUBE GROWTH

TECHNICAL FIELD

Embodiments of the invention relate to carbon nanotube processing technology. In particular, embodiments of the invention relate to directing growth of carbon nanotubes.

BACKGROUND

Carbon nanotubes are a promising material for a wide variety of applications. They are of interest due to a number of potential advantages over currently used materials, such as intrinsically small size, extremely high carrier mobility, heat conduction characteristics, mechanical strength, and others. For example, in microelectronics applications, carbon nanotubes may replace silicon in transistor applications and/or metal traces in interconnect applications, depending on the chirality and other characteristics of the carbon nanotube employed.

To utilize carbon nanotubes in some applications, it is necessary to form a single patterned carbon nanotube or patterns of well-ordered and aligned carbon nanotube arrays. However, forming patterned carbon nanotubes has many difficulties. Current techniques typically include an in situ force (e.g., electric field or flow dynamics) to direct carbon nanotube growth. Those techniques have many limitations, such as directing carbon nanotubes in only one direction (i.e., along the field lines or flow direction), which limits the arrangement and design of the carbon nanotube patterns.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION

In various embodiments, apparatuses and methods relating to carbon nanotube processing technology are described. However, various embodiments may be practiced without one or more of the specific details, or with other methods, materials, or components. In other instances, well-known structures, materials, or operations are not shown or described in detail to avoid obscuring aspects of various embodiments of the invention. Similarly, for purposes of explanation, specific numbers, materials, and configurations are set forth in order to provide a thorough understanding of the invention. Nevertheless, the invention may be practiced without specific details. Furthermore, it is understood that the various embodiments shown in the figures are illustrative representations and are not necessarily drawn to scale.

In the implementation of carbon nanotubes, it may be desirable to fabricate carbon nanotubes in well-ordered patterns and arrays. The pattern elements may each include a single carbon nanotube or arrays of any number of carbon nanotubes. Further, it may be desirable to form the carbon nanotube patterns in multiple directions and in any chosen pattern shape. Briefly, the present description provides structures and methods that enable the fabrication of well-ordered patterns of single carbon nanotubes and arrays of carbon nanotubes that include patterns having any chosen direction and shape.

FIGS. 1A-1E illustrate a method for forming patterns of single carbon nanotubes or arrays of multiple carbon nanotubes.

Figure 1A:
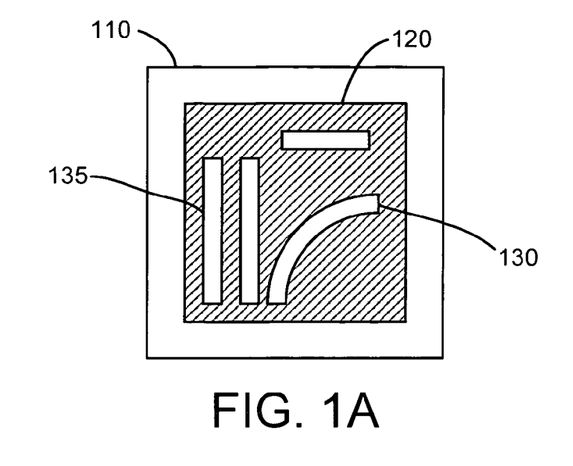
FIG. 1A is a top-down view of a pattern on a substrate.

FIG. 1A illustrates a substrate 110 and an inhibitor pattern 120, which includes openings 130, 135 that expose regions of substrate 110. Substrate 110 may include any suitable material or materials in any suitable configuration. In one embodiment, substrate 110 is a monocrystalline silicon wafer. In another embodiment, substrate 110 is a silicon-on-insulator (SOI) wafer.

Inhibitor pattern 120 may include any suitable material that chemically repels or inhibits the growth of carbon nanotubes and may therefore be referred to as a carbon nanotube inhibitor. In one embodiment, inhibitor pattern 120 includes platinum. Inhibitor pattern 120 inhibits the growth of carbon nanotubes because it reduces the chemical reactivity of and provides a repelling force to carbonaceous species. Inhibitor pattern 120 may thereby repel or stop the growth of carbon nanotubes based on its physical proximity to either a carbon nanotube catalyst or an extending end of a carbon nanotube.

Inhibitor pattern 120 may include any number of openings 130, 135 having any size, shape, and direction. In one embodiment, inhibitor pattern 120 includes openings 135 that are substantially linear, such as those having an elongated rectangular shape. In another embodiment, inhibitor pattern 120 includes openings 130 that are substantially curved. In other embodiments, inhibitor pattern 120 includes openings that are S-shaped, angled, zigzag, or round. The openings may not be directionally aligned, but may instead be at various angles (i.e., acute, right, and obtuse angles) to each other. Further, the openings may have any width or length. The width and length of the openings may be varied to control the number, size, and length of carbon nanotubes grown in the openings, as is further discussed below.

Inhibitor pattern 120 may be formed by any suitable technique or techniques. For example, inhibitor pattern 120 may be formed by a well known lift-off technique. In general, a lift-off technique includes forming a mask by lithography or other patterning technique, providing a bulk material layer over the mask, and a lift-off process to leave a pattern of the bulk material. For example, a mask that has the necessary pattern is first formed on substrate 110 by lithography techniques. Then, a layer of material is formed over the mask, such as by a metallization step. Next, the mask is removed using a lift-off technique to leave inhibitor pattern 120. The lift-off technique may remove portions of the layer of material that were over the mask and leave portions of the layer of material that were over openings in the mask.

In another embodiment, inhibitor pattern 120 may be formed by a well known etch technique. For example, a bulk layer of material is first formed on substrate 110, such as by sputtering a metal. A template defining inhibitor pattern 120 is then formed over the bulk layer of material using lithography techniques. Next, exposed portions of the bulk material are removed by an etchant to form inhibitor pattern 120. Lastly, the template is removed to leave just inhibitor pattern 120 on substrate 110.

Figure 1B:
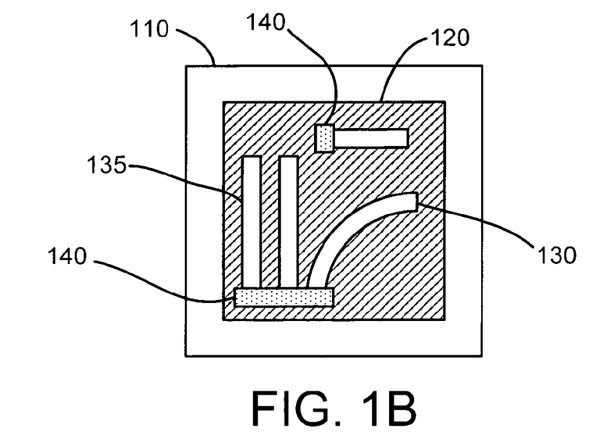
FIG. 1B is a view similar to FIG. 1A with a seed pattern patterned over the pattern and the substrate.

As illustrated in FIG. 1B, a seed pattern 140 is formed over inhibitor pattern 120 and substrate 110. Seed pattern 140 may be formed by any suitable technique or techniques. For example, seed pattern 140 may be formed by a lift-off technique or an etch technique.

Seed pattern 140 may include any material or materials, such as a catalyst, that provide a seed for the formation of carbon nanotubes. In one embodiment, seed pattern 140 includes an iron catalyst. In other embodiments, seed pattern 140 includes a catalyst material of a suitable transition metal, such as scandium, titanium, vanadium, chromium, manganese, cobalt, nickel, copper, zinc, yttrium, zirconium, niobium, molybdenum, ruthenium, rhodium, palladium, silver, cadmium, hafnium, tantalum, tungsten, rhenium, osmium, iridium, or gold. In addition, seed pattern 140 may include a matrix material to support the catalyst, such as aluminum oxide.

Seed pattern 140 may have any suitable pattern, so long as a portion of seed pattern 140 is within an opening to facilitate the growth of carbon nanotubes. In one embodiment, seed pattern 140 is formed entirely within an opening. In another embodiment, seed pattern 140 is formed such that a portion of seed pattern 140 is in an opening and another portion of seed pattern 140 is over the inhibitor material. Seed pattern 140 may cover two or more openings and span a portion of inhibitor pattern 120. In one embodiment, seed pattern 140 is formed toward an end of an opening to facilitate growth of carbon nanotubes in one direction within the opening. In another embodiment, seed pattern 140 is formed between two ends of an opening to facilitate growth in multiple directions. Further, multiple seed pattern elements may be formed within the same opening.

Figure 1C:
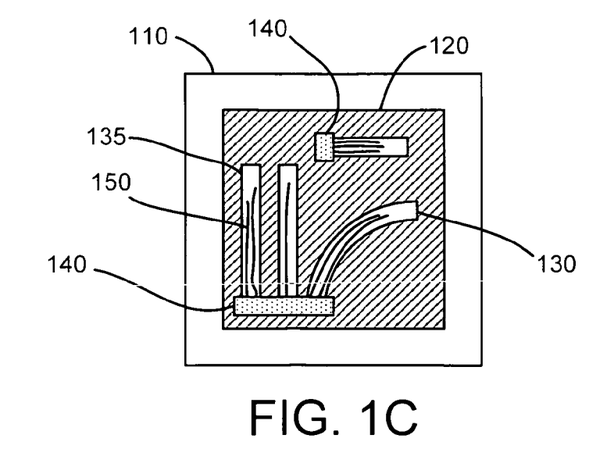
FIG. 1C is a view similar to FIG. 1B with carbon nanotubes formed within openings of the pattern.

As illustrated in FIG. 1C, carbon nanotubes 150 are formed in openings 130. Carbon nanotubes 150 may be formed by any suitable technique or techniques, such as a chemical vapor deposition method. In one embodiment, carbon nanotubes 150 are formed by passing a flow rate of about 1 SLM of an active gas, such as methane or carbon monoxide, over the catalyst at a temperature of about 900° C. and a pressure of about 1 atm, along with co-flow of hydrogen. In other embodiments, the flow rate, active gas, temperature, pressure, and catalyst are varied to form many different types of carbon nanotubes. For instance, carbon nanotubes 150 may include semiconductive carbon nanotubes. Alternatively, carbon nanotubes 150 may include conductive carbon nanotubes that are metallic in nature. In one embodiment, carbon nanotubes 150 are single wall carbon nanotubes.

As discussed above, inhibitor pattern 120 repels or inhibits the growth of carbon nanotubes 150. Consequently, the carbon nanotubes originate at the portions of seed pattern 140 that are in the openings and, as the carbon nanotubes grow, their growth is confined to the openings in inhibitor pattern 120. As shown, inhibitor pattern 120 patterns and defines carbon nanotube growth from only certain portions of seed pattern 140 in the openings without a physical masking of seed pattern 140.

An opening may include any number of carbon nanotubes. For instance, an opening may include a single carbon nanotube. Alternatively, an opening may include arrays of hundreds or thousands of carbon nanotubes which are densely packed. The resulting carbon nanotube patterns follow the patterned opening and thus may have substantially linear, curved, S-shaped, angled zigzag, or round patterns. Further, the width and length of the openings may be varied to control the number, size, and length of carbon nanotubes grown in the openings.

Figure 1D:
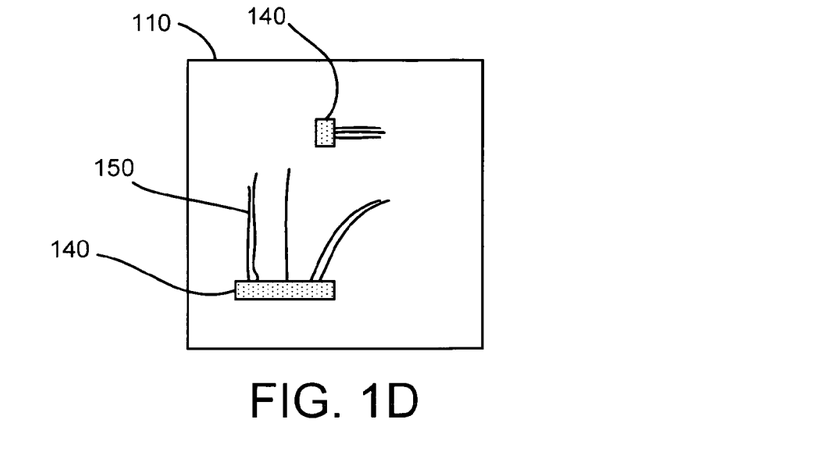
FIG. 1D is a view similar to FIG. 1C with a portion of the pattern removed.
Figure 1E:
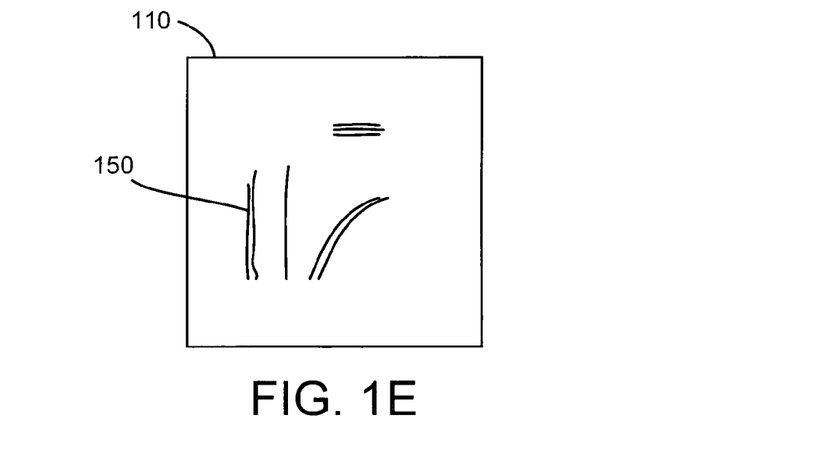
FIG. 1E is a view similar to FIG. 1D with the seed pattern and the remainder of the pattern removed.

As illustrated in FIG. 1D, exposed portions of inhibitor pattern 120 are removed by any suitable means. In one embodiment, the exposed portions are removed by an etch process, such as a wet etch process. Portions of inhibitor pattern 120 that are under seed pattern 140 may remain. As illustrated in FIG. 1E, seed pattern 140 and any remaining portions of inhibitor pattern 120 are removed by any suitable technique, such as an etch process. In one embodiment, the entirety of inhibitor pattern 120 and inhibitor pattern 140 may be removed in one process step.

The carbon nanotubes thus formed may be used in any suitable application, such as a transistor channel material or as a conductive interconnect element.

FIGS. 2A-2E illustrate another method for forming patterns of single carbon nanotubes or arrays of multiple carbon nanotubes.

Figure 2A:
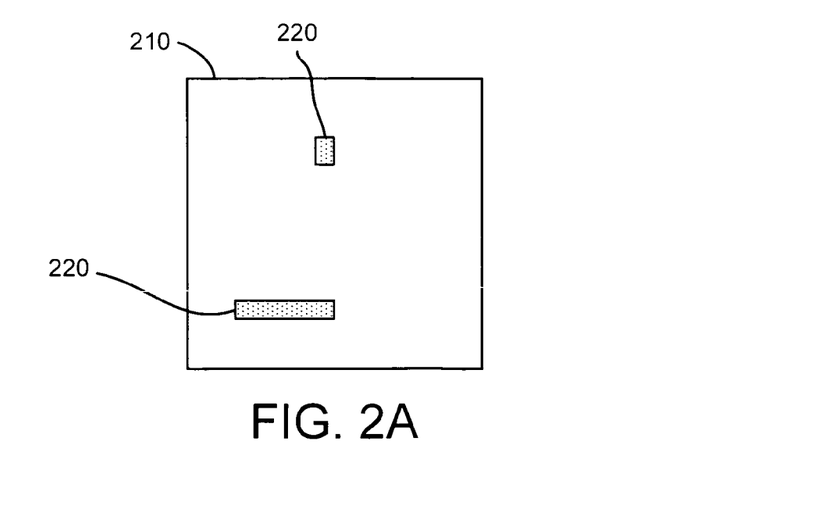
FIG. 2A is a top down view of a seed pattern patterned on a substrate.

FIG. 2A illustrates a substrate 210 and a seed pattern 220. Substrate 210 and seed pattern 220 may include any suitable materials as discussed above. Seed pattern 220 may be formed on substrate 210 by any suitable technique, such as lift-off or etch techniques.

Figure 2B:
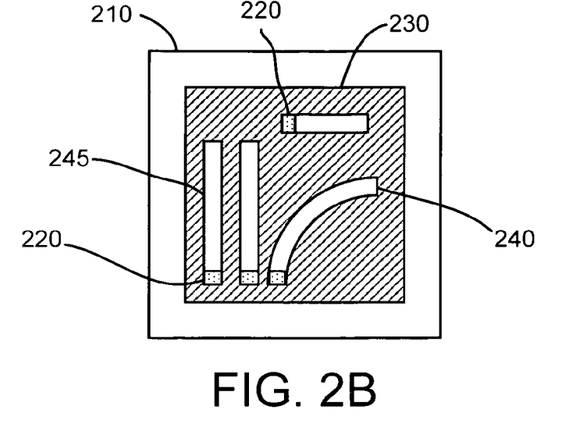
FIG. 2B is a view similar to FIG. 2A with a pattern formed over the seed pattern and the substrate.

As illustrated in FIG. 2B, an inhibitor pattern 230, including openings 240, 245 is formed over seed pattern 220 and substrate 210. Inhibitor pattern 230 may include any number of openings that have any size, shape, and direction as discussed above, so long as the openings align with seed pattern 220 such that the openings expose a portion of seed pattern 220 and a region of substrate 210. As previously discussed, inhibitor pattern 230 may include any suitable material that chemically repels or inhibits the growth of carbon nanotubes. Inhibitor pattern 230 may be formed by any suitable technique, such as lift-off or etch techniques.

Figure 2C:
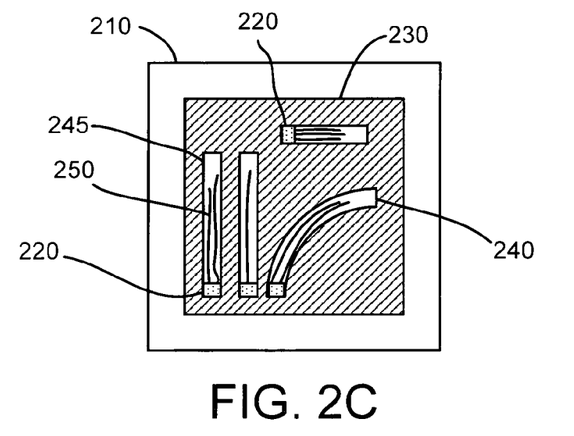
FIG. 2C is a view similar to FIG. 2B with carbon nanotubes formed within openings of the pattern.

As illustrated in FIG. 2C, carbon nanotubes 250 are formed within the openings. Carbon nanotubes 250 may be formed by any of the techniques discussed with reference to FIG. 1C. The carbon nanotubes may substantially follow the pattern of the openings of inhibitor pattern 230 and they may of many different types and configurations as discussed above.

Figure 2D:
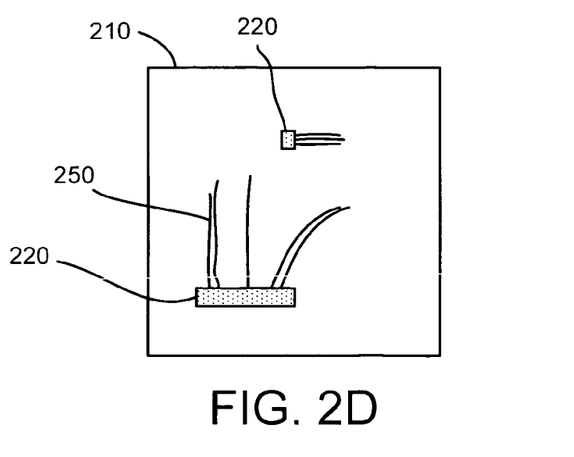
FIG. 2D is a view similar to FIG. 2C with the pattern removed.
Figure 2E:
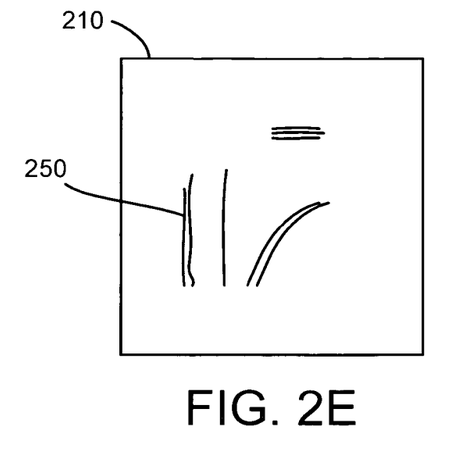
FIG. 2E is a view similar to FIG. 2D with the seed pattern removed.

As illustrated in FIG. 2D, inhibitor pattern 230 is removed by any suitable technique, such as an etch process. As illustrated in FIG. 2E, seed pattern 220 is removed by any suitable technique, such as an etch process. In one embodiment, the entirety of inhibitor pattern 230 and seed pattern 220 may be removed in one process step.

The linear carbon nanotube patterns described above with reference to FIGS. 1A-1E and 2A-2E may be formed using the above described methods in conjunction with other known methods for forming linear carbon nanotube patterns. For example, an in situ force, such as an electric field or fluid flow, may be applied along the direction of the linear opening to further align the carbon nanotube patterns along the linear opening.

Figure 3A:
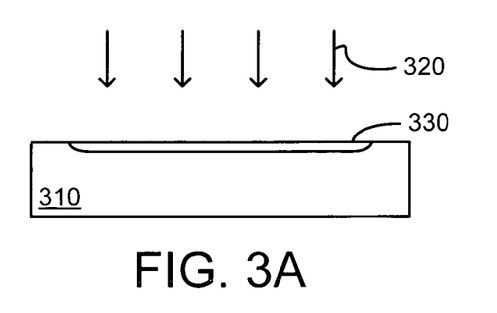
FIG. 3A is a cross sectional view of an implant region being formed in a substrate.
Figure 3B:
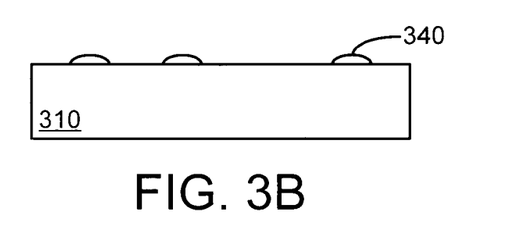
FIG. 3B is a view similar to FIG. 3A after an anneal process has formed surface catalysts on the substrate surface.
Figure 3C:
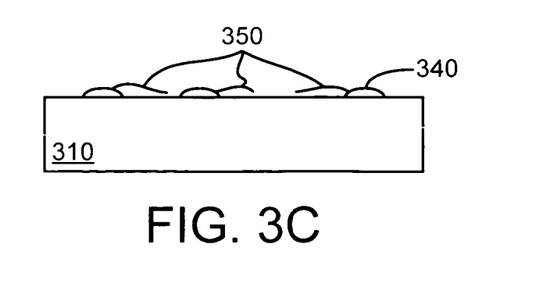
FIG. 3C is a view similar to FIG. 3B with carbon nanotubes formed from the surface catalysts.

FIGS. 3A-3C illustrate another method for forming carbon nanotubes on a substrate.

FIG. 3A illustrates an implant 320 performed on a substrate 310 to form an implant region 330. Substrate 310 may include any suitable material, such as silicon or silicon on insulator.

Implant 320 may include any suitable implant species that catalyzes or seeds the growth of carbon nanotubes. In various embodiments, implant 320 includes iron, cobalt, or nickel atoms. The conditions of implant 320, such as implantation dose, energy, and angle may be controlled to determine the depth and concentration of implant region 330.

As illustrated in FIG. 3B, substrate 310 is annealed to form surface catalysts 340. The anneal may cause the implant species to diffuse to the surface of substrate 310 and coalesce to form surface catalysts 340. In general, surface catalysts 340 may also be referred to as catalyst islands or quantum dots. The depth and concentration of the implant region and the conditions of the anneal process, such as temperature, duration, and temperature ramping, may be controlled to determine the size and density of surface catalysts 340 that are formed. However, as shown, the location of surface catalysts 340 is not well controlled. As illustrated in FIG. 3C, carbon nanotubes 350 are formed from surface catalysts 340. The carbon nanotubes may be formed by any of the techniques discussed. As shown in FIG. 3C, the position and growth direction of the carbon nanotubes may not be well defined.

Figure 4A:
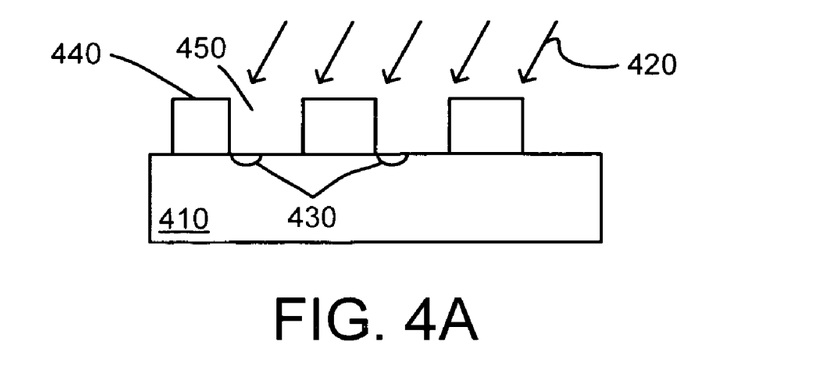
FIG. 4A is a cross sectional view of a pattern on a substrate surface, and implant regions being formed by an angled implant.
Figure 4B:
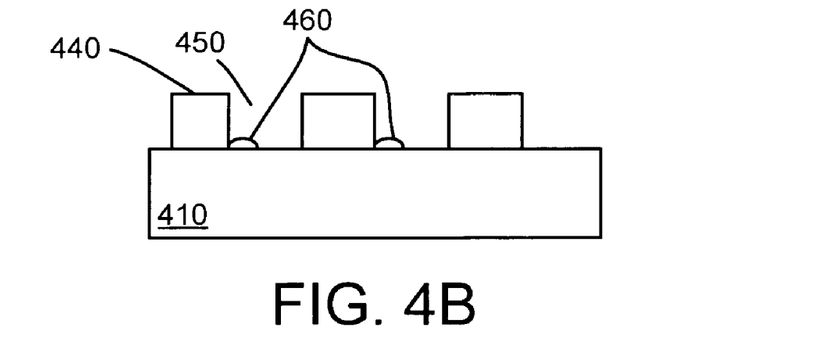
FIG. 4B is a view similar to FIG. 4A after an anneal process has formed surface catalysts on the substrate surface.
Figure 4C:
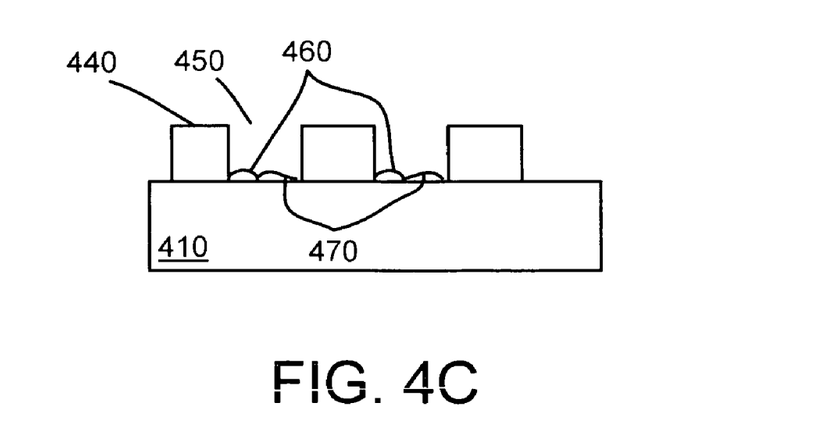
FIG. 4C is a view similar to FIG. 4B with carbon nanotubes formed from the surface catalysts and within openings of the pattern.

FIGS. 4A-4C illustrate another method for forming patterns of single carbon nanotubes or arrays of multiple carbon nanotubes.

FIG. 4A illustrates a pattern 440 including openings 450 on the surface of a substrate 410, and an angled implant 420 forming implant regions 430.

Substrate 410 includes any suitable substrate, such as silicon or silicon on insulator. Pattern 440 may include any suitable material that blocks angled implant 420 from reaching substrate 410. In one embodiment, pattern 440 includes the same material as substrate 410. Pattern 440 may then be formed by etching substrate 410. In another embodiment, pattern 440 includes a material that chemically inhibits or blocks the growth of carbon nanotubes, such as platinum. Pattern 440 may then be formed by a lift off or etch technique.

Pattern 440 may include any suitable pattern such that a part of angled implant 420 is blocked to form implant regions 430 in only a portion of openings 450. In general, implant regions 430 may be referred to as shadow implant regions. In one embodiment, implant regions 430 align along an edge of openings 450. Pattern 440 may include any number of openings 450 having any suitable size, shape, and direction that may generate implant regions 430 and guide the formation of carbon nanotubes within openings 450.

Angled implant 420 may include any suitable implant species that catalyzes or seeds the growth of carbon nanotubes and the implantation conditions may be varied to vary the depth and concentration of implant regions 430, as described above with reference to FIG. 3A.

As illustrated in FIG. 4B, an anneal is performed to form surface catalysts 460. As discussed with reference to FIG. 3B, the anneal may cause the implant species to diffuse to the surface of substrate 410 and coalesce to form surface catalysts 460. Pattern 450 and angled implant 420 may determine the location of surface catalysts 460, such that surface catalysts 460 are at or near an edge of openings 450.

As illustrated in FIG. 4C, carbon nanotubes 470 may be formed by previously discussed techniques. Pattern 440 may then direct the growth of carbon nanotubes 470. In one embodiment, pattern 440 may direct the growth of carbon nanotubes 470 by physically directing them from surface catalysts 460 into openings 450. In another embodiment, pattern 440 may include a material, such as platinum, that chemically inhibits the growth of carbon nanotubes 470 and thereby directs their growth into openings 450. Carbon nanotubes 470 may then grow from surface catalysts 460 and within the opening. For linear carbon nanotube patterns, the described method may be combined with a known method, such as an in situ force, to further direct the carbon nanotube growth.

Reference throughout this specification to "one embodiment" or "an embodiment" means that a particular feature, structure, material, or characteristic described in connection with the embodiment is included in at least one embodiment of the invention. Thus, the appearances of the phrases "in one embodiment" or "in an embodiment" in various places throughout this specification are not necessarily referring to the same embodiment of the invention. Furthermore, the particular features, structures, materials, or characteristics may be combined in any suitable manner in one or more embodiments.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A method comprising:
    forming a carbon nanotube inhibitor pattern on a substrate surface, wherein the carbon nanotube inhibitor pattern includes an opening that exposes a region of the substrate surface;
    forming a catalyst seed pattern over the substrate surface, wherein at least a portion of the catalyst seed pattern is on a portion of the exposed region; and
    growing a carbon nanotube from the catalyst seed pattern and on the exposed region of the substrate surface, wherein the carbon nanotube inhibitor pattern directs the growth of the carbon nanotube, wherein the carbon nanotube inhibitor pattern comprises platinum.

2. The method of claim 1, wherein the opening has a linear shape, and wherein the carbon nanotube is within the opening and has a substantially linear shape.

3. The method of claim 2, wherein the portion of the catalyst seed pattern on the portion of the exposed region is toward an end of the exposed region.

4. The method of claim 1, wherein the opening has an arched shape, and wherein the carbon nanotube is within the opening and has a substantially arched shape.

5. The method of claim 1, wherein forming the catalyst seed pattern comprises forming a second portion of the catalyst seed pattern on the carbon nanotube inhibitor pattern.

6. The method of claim 1, wherein the catalyst seed pattern comprises iron.

7. The method of claim 1, wherein the catalyst seed pattern comprises a support matrix including aluminum oxide.

8. The method of claim 1, further comprising:
    removing the carbon nanotube inhibitor pattern; and
    removing the catalyst seed pattern.

9. The method of claim 1, further comprising:

growing an array of carbon nanotubes from the catalyst seed pattern and on the exposed region of the substrate surface, wherein the carbon nanotube inhibitor pattern directs the growth of the array of carbon nanotubes into the region.

10. A method comprising:

forming a platinum pattern on a substrate surface, wherein the platinum pattern includes an opening that exposes a region of the substrate surface;

forming a catalyst seed pattern on a portion of the exposed region of the substrate surface; and growing a carbon nanotube from the catalyst seed pattern and on the exposed region of the substrate surface, wherein the platinum pattern directs the growth of the carbon nanotube.

11. The method of claim 10, wherein the catalyst seed pattern comprises iron.

12. The method of claim 10, wherein the opening has a linear shape, and wherein the carbon nanotube is within the opening and has a substantially linear shape.

13. The method of claim 12, further comprising:

applying an electric field along the direction of the linear opening to direct the growth of the carbon nanotube.

* * * * *

UNITED STATES PATENT AND TRADEMARK OFFICE
CERTIFICATE OF CORRECTION

PATENT NO. : 7,638,169 B2
APPLICATION NO. : 11/391920
DATED : December 29, 2009
INVENTOR(S) : Radosavljevic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this

Twenty-first Day of December, 2010

David J. Kappos
*Director of the United States Patent and Trademark Office*